(12) United States Patent
Peter et al.

(10) Patent No.: US 6,226,569 B1
(45) Date of Patent: May 1, 2001

(54) ABSOLUTE VALUE TRANSMITTER ACTING AS A ROTATION TRANSMITTER FOR REGISTRATION OF A STEERING ANGLE OF A MOTOR VEHICLE

(75) Inventors: Cornelius Peter, Bühl; Wolfgang Huber, Deisenhausen; Trevor Stewart, Rielasingen-Worblingen; Zdenek Pavlis, Singen, all of (DE); Danilo Caratto, Torino (IT)

(73) Assignee: TRW Automotive Electronics & Components GmbH & Co. KG, Radolfzell (DE)

( * ) Notice: Subject to any disclaimer, the term of this patent is extended or adjusted under 35 U.S.C. 154(b) by 0 days.

(21) Appl. No.: 09/331,145
(22) PCT Filed: Dec. 1, 1997
(86) PCT No.: PCT/DE97/02798
  § 371 Date: Oct. 20, 1999
  § 102(e) Date: Oct. 20, 1999
(87) PCT Pub. No.: WO98/25101
  PCT Pub. Date: Jun. 11, 1998

(30) Foreign Application Priority Data

Dec. 2, 1996 (DE) ............................................. 196499119
Dec. 12, 1996 (DE) ............................................. 196517710

(51) Int. Cl.$^7$ ............................... G05D 1/02; G05D 1/10
(52) U.S. Cl. .................. 700/302; 700/254; 700/255; 700/275; 700/260; 700/261; 341/2; 341/13; 341/15; 318/587; 701/24; 701/224
(58) Field of Search ................................. 700/261, 260, 700/254, 255, 275, 302; 341/13, 2, 15; 318/587; 701/224, 24

(56) References Cited

U.S. PATENT DOCUMENTS 3,746,842  *  7/1973  Fowler ............................................. 377/17

(List continued on next page.)

FOREIGN PATENT DOCUMENTS 2 126 444    3/1984   (GB) .
4-1522       1/1992   (JP) .

OTHER PUBLICATIONS

Nagel et al., T/sup 3/wT: Tracking Turning Trucks With Trailers, IEEE., pp. 65–72, 1998.*

(List continued on next page.)

Primary Examiner—William A. Cuchlinski, Jr.
Assistant Examiner—McDieunel Marc
(74) Attorney, Agent, or Firm—Fay, Sharpe, Fagan, Minnich & McKee, LLP

(57) ABSTRACT

A rotary transmitter for registration of the steering angle of a motor vehicle, with a transmitter component (49) on which is provided a coding (51) of a predetermined number n of locally sequentially digital words ($W_i$) with a width of m bits ($b_1, b_2, \ldots, B_m$) in m adjacent to each other tracks, at least one detector (55) for essentially simultaneous registration of the individual bits ($b_1, b_2, \ldots, B_m$) of a digital word ($W_i$), whereby the transmitter component (49) and at least the one detector (55) are movable relative to each other, and with an evaluation unit (11) to which is conducted the signal of at least the one detector (55). The evaluation unit (11) ascertains the absolute position of the transmitter component (49) relative to at least the one detector (55), at least one time, by evaluation of a predetermined number (p) of sequentially detected digital words ($W_i$), whereby the evaluation unit (11) assigns to a detected p-measure ($W_i, W_{i+1}, \ldots, W_{i+p-1}$), consisting of the predetermined number (p) of sequentially detected digital words ($W_i$), a defined position value of the transmitter component (49) relative to at least the one detector (55). The coding is hereby designed in such manner that all sequences ($W_i, W_{1+1}, \ldots, W_{i+p-1}$) from among the sequential words ($W_i$) consisting of the predetermined number (p) are uniquely defined at least within a predetermined uniquely defined area (I. II) of coding (51) and that within each uniquely defined area (I, II) the digital words ($W_i$) are not uniquely defined.

21 Claims, 3 Drawing Sheets

U.S. PATENT DOCUMENTS

| | | | |
|---|---|---|---|
| 4,071,818 | * | 1/1978 | Krisst .............................. 324/207.13 |
| 4,074,258 | * | 2/1978 | Dore et al. ............................. 341/13 |
| 4,631,519 | * | 12/1986 | Johnston ................................ 341/13 |
| 5,341,130 | * | 8/1994 | Yardley et al. ................. 340/825.06 |
| 5,529,138 | * | 6/1996 | Shaw et al. .......................... 180/169 |

OTHER PUBLICATIONS

Kanayama, "Rotary Vehicle" That Moves With Three Dregrees Of Freedom, IEEE., pp. 713–718, 1997.*

Reister et al., Position And Constdraint Force Control Of A Vehicle With Two Or More Steerable Drive Wheels, IEEE., pp. 723–731, 1993.*

* cited by examiner

ABSOLUTE VALUE TRANSMITTER ACTING AS A ROTATION TRANSMITTER FOR REGISTRATION OF A STEERING ANGLE OF A MOTOR VEHICLE

The invention concerns a digital absolute value transmitter, specifically a rotation transmitter for registration of the steering angle of a motor vehicle.

Highly accurate registration of the steering angle gains ever growing importance in modern motor vehicles, whereby, for example the steering angle is needed in regard to active dynamic moving mechanisms for control or regulation of the moving gear state or moving gear behavior. In practically all instances, the highly accurate registration of the absolute value of the steering angle is needed. This, however, requires extremely accurate absolute value transmitters, with generally costly construction and correspondingly high expenditure.

Known digital absolute value transmitters (for example JP 4-1522 A) which are suitable as rotation transmitters for registration of the absolute rotation angle, have, as a rule, an encoding, which, by scanning each word, i.e. bits in one line, permits the determination of a value assigned to said word. It is, however, of disadvantage with respect to such digital absolute value transmitters that the words must have a relatively large width in order to ensure adequate resolution. In this context, a digital absolute position encoder or encoding method is known from DE 195 45 949 A1, in which the number of the required tracks for providing an absolute value transmitter is reduced by a single-step code; said benefit, however, is only obtained by utilization of several detectors per track. This means higher circuit-engineering expenditure.

That also applies with respect to absolute value transmitters which have only one single track, and which concurrently scan several bits of the track, whereby the digital words of a code are sequentially connected in the track (for example JP 08-122099 A; DE 40 22 503 C1; DE 195 18 664 C1).

The above specified absolute value transmitters permit immediate determination of absolute position in each position, but require high expenditure.

Relative value transmitters can be realized more simply and more cost-favorable, but in such case an initialization process is necessary before operating the system for calibration of the relative value transmitter. To that end, for example, the steering system or the steering wheel must be brought into a defined position, staring from which, a determination of the absolute values of the steering angle can be made via relative registration of the steering angle. Although it is, in fact, possible to also store the starting value (initialization value) for determination of the absolute value so that if the system loses tension, the value remains preserved, the problem rests in the fact that if the system is switched off, steering movements are no longer registered and, consequently, following activation of the system, an initialization process would have to be gone through.

In addition, absolute value transmitters are known which link incremental and absolute coding- or decoding methods (for example EP 0 530 176 A1; EP 0 545 701 A1). As a rule, one incremental code is used covering the entire to be registered range and one absolute code at one or several selection positions. The absolute positions are registered by means of a first detector as with conventional absolute value transmitters, whereby, however, only a small width for the digital words is required. Starting from the then known absolute position, it is then possible, by means of the incremental code, which is being scanned by another detector, to determine the respective absolute position when there is a relative movement of code and detector.

This type of absolute value transmitter also required a relatively high expenditure and can only register correctly the absolute position, after losing power, if the first absolute code had been reached. In motor vehicle technology this is not permissible for reasons of safety.

The invention is therefore based on the object to provide an absolute value transmitter, specifically a rotation transmitter for registration of the steering angle of a motor vehicle, which can be realized as simply as possible and cost-friendly and which ensures, at the same time, adequate operating safety, specifically after the system has lost power.

The invention solves this object with the characteristics of Patent claim 1.

By the at least one-time determination of the absolute rotation angle by evaluation of a pre-determined number p of sequentially detected digital words ($W_i$) there results the benefit of substantially lower required word width. For first-time determination of the absolute value, overtravel of p words is necessary, so that, to that end, the transmitter component must, initially, be moved by p-times the resolution. However, after first-time determination of the absolute value, the maximal resolution is then again reached, i.e. the absolute value can be exactly determined with each overtravel of a word ($W_i$). All sequences ($W_i$, $W_{i+1}$, $W_{i+p-1}$) consisting of predetermined numbers (p) of sequential words ($W_i$) of the encoding must be, to that end, uniquely defined, at least within a predetermined uniquely defined range of the encoding. Without complying with this requirement, a given p-measure cannot be assigned a defined absolute value. In contrast thereto, within each uniquely defined range, the digital words ($W_i$) need not be uniquely defined.

In the preferred specific embodiment of the invention, at least one of the following conditions is complied with:

a) in each instance, two adjacent words, $W_i$, $W_{i+1}$ have different values, i.e. $W_i$ is not equal to $W_{i+1}$;

As a result of this, step recognition is made possible by the evaluation only of the signal generated by encoding, so that synchronized scanning can be relinquished;

b) the respective words $W_{i-1}$ and $W_{i+1}$, adjacent to the word $W_i$; have different values, in other words $W_{i-1}$ and $W_{i+1}$ are not equal; This permits recognition of change in the movement direction by evaluation of only the signal generated by the encoding; without said requirement it would not be possible, in case of a change in the direction of the movement, after prior registration of the words $W_{i-1}$, $W_i$, . . . , $W_{p-2}$, $W_{p-1}$ to determine whether in case $W_{p-2}=W_p$ the value $W_p$ was produced by a movement in the same direction or by a movement in the opposite direction; that applies at least if the evaluation unit realizes the p-measure in form of a first in—first out register, whereby each new word $W_i$ is always "inserted" in the register of the fixed length p from the same end and that, respectively, prior to the insertion, the last word is dropped, independent of whether prior to registration of said $W_i$ a change took place in the direction of movement.

c) no p-measure ($W_i$, $W_{i+1}$, . . . , $W_{i+p-1}$) may exist within at least one uniquely defined range of the encoding as mirror-image p-measure ($W_{i+p-1}$, $W_{i+1}$, $W_i$) in other words ($W_i$, $W_{i+1}$, . . . , $W_{i+p-1}$) is not equal to $W_{i+p-1-k}$, . . . , $W_{i+1-k}$, $W_{i-k}$); Otherwise it could not be determined by evaluation alone from the signal generated by the encoding whether the respective p-measure was generated in overtravel from one or the other direction;

Thus, recognition of the absolute movement direction is hereby facilitated.

This condition could only be dropped when in each instance recognition of the movement direction would be ensured by providing an additional device.

According to one specific embodiment of the invention, the evaluation unit can in each instance effect the determination of the absolute value by allocating the respective predetermined value to the actual p-measure.

The possibility, however, also exists, to effect said possibility of absolute value determination only once or at given intervals, or for certain reasons, and to determine future absolute values by incrementation or decrementation. Thus, only one evaluation is necessary for step recognition and for recognition of a change in the direction of movement.

A change in the direction of movement can be effected in simple fashion by satisfying the above mentioned condition b) by evaluation of the words $W_{p-2}$ and $W_p$:

If both words agree, then a change in the direction of movement has taken place.

In one specific embodiment of the invention, which affords added safety, the absolute value can be determined both by evaluation of the p-measure as well as by incrementation/decrementation of the prior value and with lack of agreement, an error signal can be generated.

In the preferred specific embodiment of the invention, p=3 sequential words $W_i$ are evaluated. Combined with a word width m=3 (3 bit) of the digital words, an excellent compromise results between sufficient encoding length (permissible n number of digital words using the above mentioned conditions) and thus the attainable resolution and the calculation expenditure for the evaluation, including the required movement path for the first-time determination of the absolute position value, for which at least p (here p=3) digital words must be registered by at least the one detector.

According to the preferred specific embodiment of the invention, the encoding comprises at least two connecting areas, whereby the aforementioned encoding conditions are satisfied both within the areas as well as at the interfaces. Encoding within the areas is preferably identical and extends in the same direction.

According to another specific embodiment of the invention, there is provided, for step recognition and/or recognition of the rotation direction and/or a change in rotation direction an additional track to the tracks for the digital words ($W_i$) with sequential values, logical [value] "zero" and logical [value] "one", or a track for the digital words of the encoding is designed in this manner.

For scanning the track with alternating sequence of values, logical "zero" and logical "one" there may preferably be provided two detectors, staggered by half a step, whereby the evaluation unit determines the rotation direction and/or a change in the direction of rotation from the phase displacement of the sensor signals. In addition, the evaluation unit is able to determine from the signal of one or both sensors whether a step has taken place and can, dependent thereon, perform a scanning of the digital word.

Encoding can be designed in such manner that within at least one uniquely defined area for one, several or all sequences ($W_i, W_{i+1}, \ldots, W_{i+p-1}$) of the encoding there also exists the respective mirror-image sequence of the encoding ($W_{1+p-1}, \ldots, W_{i+1}, W_i$) and that the evaluation unit determines from the direction of the rotation and the detected p-measure, the absolute value. This produces maximal length of encoding with assured step recognition.

Equivocation of encoding with several uniquely defined areas outside the uniquely defined areas may be done, according to the invention, by providing one registration device for unrefined registration of the absolute position and additional evaluation of its position signal. The accuracy of said unrefined registration device must in each case be better than the difference of each of the position values corresponding to at least two encoding areas. The evaluation unit is then able to determine the exact absolute position value by evaluating the signal of at least one detector for registration of the encoding and the signal of the approximate registration device with the accuracy and the resolution of the encoding.

In the preferred specific embodiment of the invention, the evaluation unit undertakes the following steps in ascertaining the exact absolute position value:

a) determination of the actual signal of the registration device for approximate registration of the corresponding position value ($\alpha_a$);

b) determination of a lower and upper barrier ($\alpha_a-\delta$; $\alpha_a+\delta$) of a permissible tolerance range for the ascertained position value ($\alpha_a$), whereby the width ($2\delta$) of the tolerance range is smaller than each uniquely defined range of the encoding of the transmitter component;

c) determination of the multi-valued position value $\alpha_r$ by evaluation of the signal of at least one of the detectors reading the encoding;

d) determination of the corrected absolute value $\alpha_{r,corr}$ according to the formula:

$$\alpha_{r,corr}=INT[(\alpha_a+\delta)/\alpha_{a.max}]\times\alpha_{r.max}+\alpha_r$$

for $\alpha_r < \alpha_{r.max}/2$ $$\alpha_{r,corr}=INT[(\alpha_a-d)/\alpha_{r.max}]\times\alpha_{r.max}+\alpha_r$$

for $\alpha_r > \alpha_{r.max}/2$ $\alpha_{r.max}$ stands for the maximally possible value for the absolute (multi-valued) position by evaluation of the p-measure.

In the preferred specific embodiment, the evaluation unit examines whether the ascertained absolute position value $\alpha_{r,corr}$ lies within the permissible tolerance range $\alpha_a-\delta < \alpha_{r,corr} < \alpha_a+\delta$ and produces in case of error an error signal and/or performs a compensation of the approximate registration device. For example, the evaluation unit can, to that end, determine the difference between the ascertained absolute value ($\alpha_{r,corr}$) and the position value ($\alpha_a$) and deposit same in a preferably non-volatile memory and use it as correction value for future determinations of the position value ($\alpha_a$).

According to one specific embodiment of the invention, the absolute value transmitter is designed as rotation transmitter, whereby the transmitter component is rotatably connected with a component whose rotation angle is to be registered, for example, the steering shaft of a motor vehicle or a component connected with same. The encoding provided on the transmitter component is preferably endless and is arranged on the outer circumference of the transmitter component. At each interface, the requirements according to claim 2 are complied with.

Additional specific embodiment are apparent from the sub-claims.

In the following, the invention is explained in more detail, using one of the exemplary embodiments depicted in the drawing.

Figure 1:
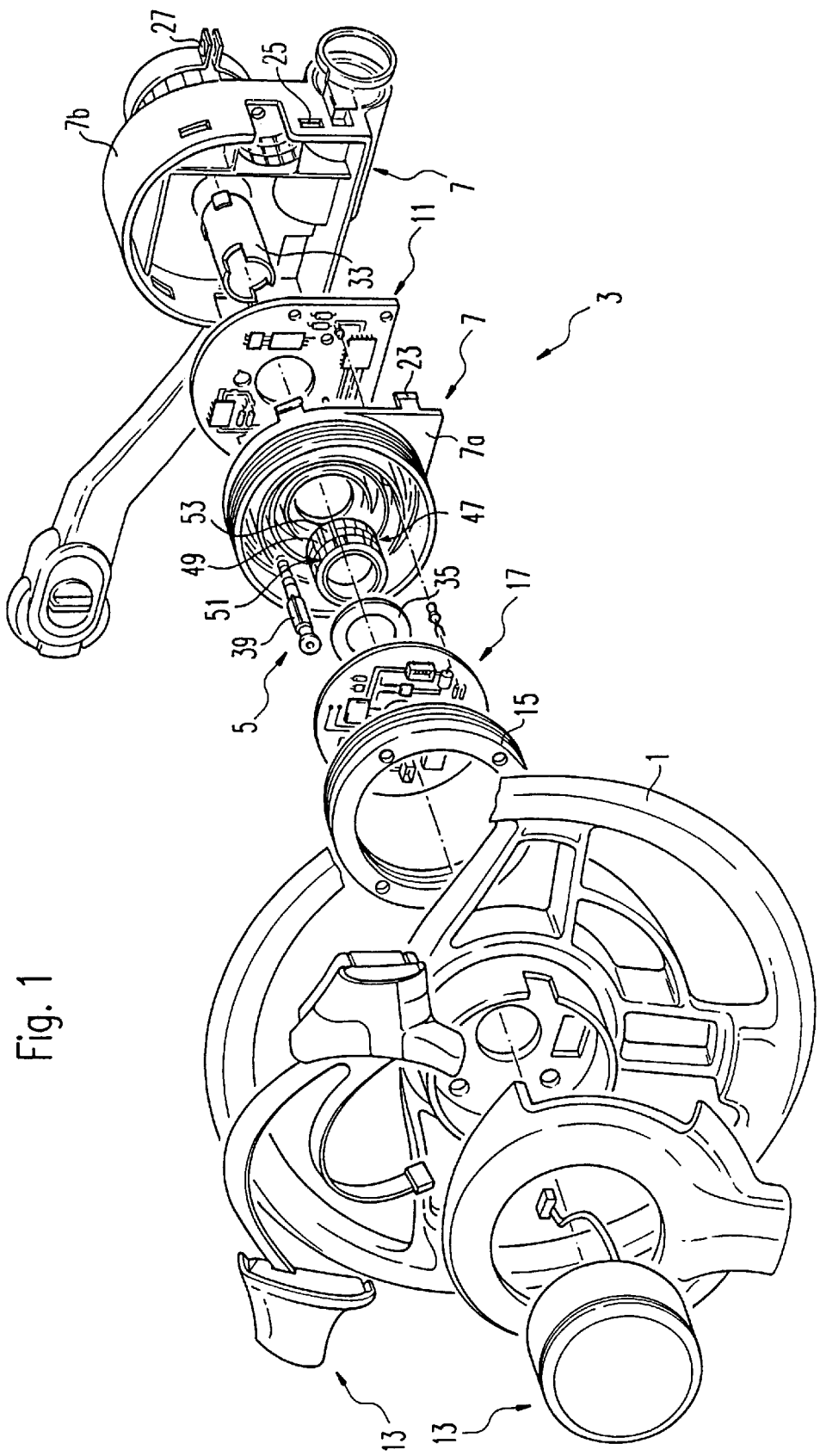
FIG. 1 shows a perspective, exploded representation of components of a steering system, essential for understanding the invention, with a digital absolute value transmitter according to the invention.

The components illustrated in FIG. 1 involve, essentially, the steering wheel 1 and a multi-function unit 3, which, among others, includes an absolute value transmitter 5 for registration of the steering angle.

The multi-function unit 3 consists of a stationary housing component 7, which consists of the two halves 7a and 7b. The stationary housing component 7 is designed in such manner that it can be pushed onto a steering column 9 (FIG. 2) and surrounds same.

Into the half 7b of the housing component 7 can be integrated, as shown in FIG. 1, additional components such as steering column switch, ignition lock and similar. Also, an electronic unit is provided in the interior of half 7b of housing component 7, which comprises the necessary circuits on the stationary side of the multi-function unit 3. This may involve details of circuits for the steering column switch, the ignition lock and data transmission from and to the operating units 13 provided at the steering wheel and also the evaluation unit for the absolute value transmitter according to the invention.

Furthermore, the multi-function unit 3 has a housing component 15, which is attachable to the reverse side 1a of the central area of the steering wheel and which serves for acceptance of a transmitter/receiver unit 17, comprising the required circuits of the functional units 13 arranged at the steering wheel 1 for transmission of data from and to the steering wheel.

Figure 2:
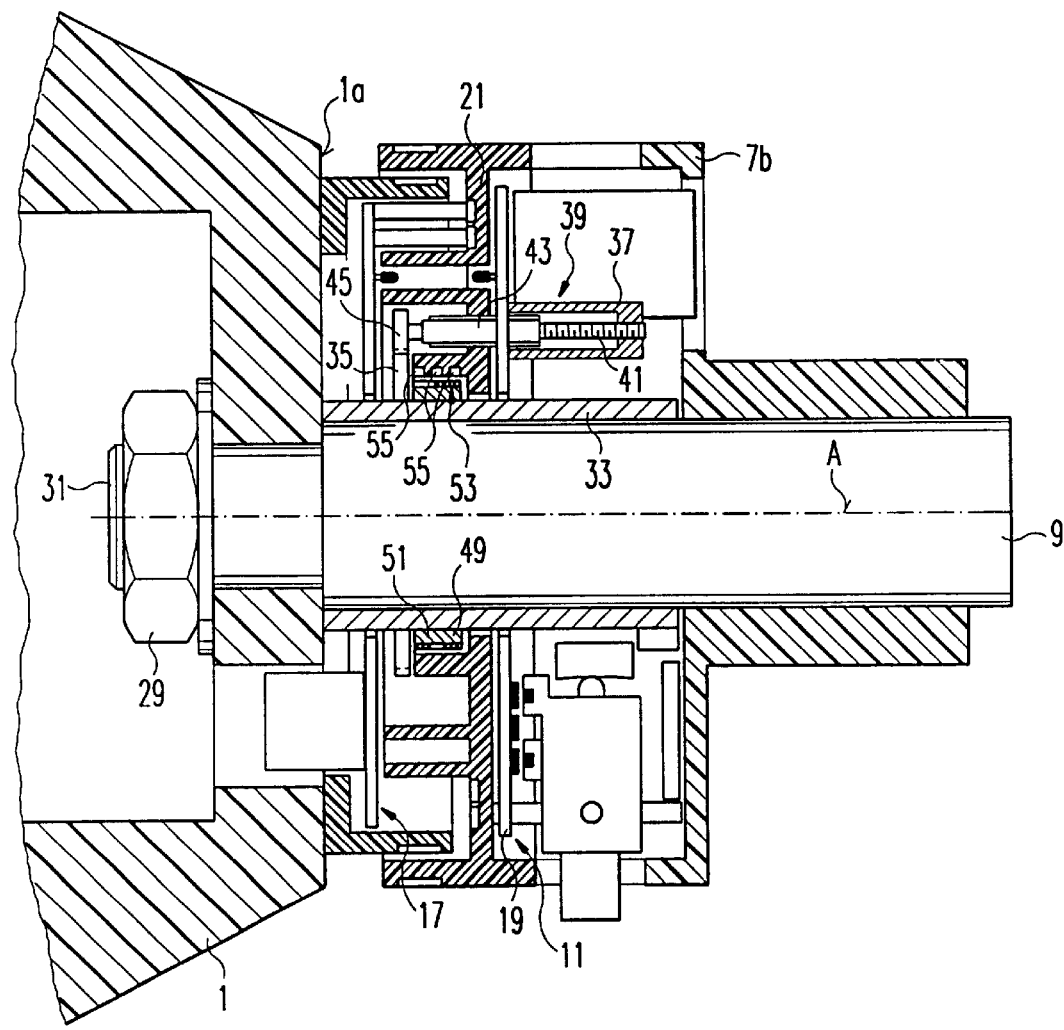
FIG. 2 shows a longitudinal section through the assembled steering system according to FIG. 1

As can be seen from FIG. 2, the circuits of the electronic unit 11 are arranged on a plate 19, which is fastened (not shown in detail) in the interior of half 7b of housing component 7. The interior space of half 7b is essentially tightly sealed by the back wall, extending radially vis-a-vis axis A of steering column 9, of half 7a of the housing component 7. For that purpose, half 7a is connected with half 7b by means of engagement elements 23 formed onto 7a, whereby the engagement elements 23 engage with corresponding recesses 25 in half 7b.

The backwards area of half 7b of housing component 7 encloses, with its central recess, the steering column 9 and can be connected, by means of a clip 27, torsion-proof with the relative to the remainder of the vehicle stationary [with the steering column non-rotatable] outside of the steering column 9. The steering wheel 1 is connected, by means of a nut 29, with steering shaft 31, which is equipped, for that purpose in its foremost region with screw thread. Furthermore, a bushing 33 is connected torsion-proof with the steering wheel 1, said bushing envelopes the steering column 9. On the bushing 33 is attached, torsion-proof a first gear wheel 35, which is thus rotatable together with the steering wheel 1.

On the backwards side of the plate 19 is arranged a plunger coil 37 of a plunger coil unit 39, serving as registration unit for approximate registration of the absolute steering angle. The plunger coil 37 can have connection terminals (not shown here) for the coil, which engage with contact bores in plate 19 and which can be welded in place at the same time with the other modular electronic components.

The plunger coil unit 39 also comprises a thread spindle 41 which is retained, with its posterior end rotatably in the rear wall of the plunger coil 37. On the thread spindle 41 is retained a plunger element 43, whereby the plunger element 43 is fitted with a thread bore, which cooperates in such fashion with the exterior thread of the thread spindle 41 that with a rotation of the thread spindle 41 the plunger element 43 is moved translatorially into the coil 37 and out of same. The plunger element 43 preferably consists of ferrite material and is, additionally, guided in its displacement direction through the interior wall of the plunger coil 37.

At the anterior end of the thread spindle 41, a second gear wheel 45 is torsion-proof arranged which mates with the first gear wheel retained torsion-proof on the bushing 33.

In this manner, the rotational movement of steering wheel, and the therewith torsion-proof connected bushing 33, is translated into a translatorial movement of the plunger element 43 of the plunger coil unit 39.

The evaluation unit 11—(only this component of the electronic unit is of importance for understanding the invention),—provided on the plate 19 assesses induction changes of the plunger coil unit 39 as result of the translatorial movement of the plunger element 43 and thus converts the rotational movement of the steering wheel into a corresponding electrical signal. This may, of course, involve an analog or a digital signal.

In addition to the above described registration device for approximate registration of the steering angle, the absolute value transmitter 5, according to FIG. 1, comprises a device 47 for accurate registration of the steering angle. This device consists, on the one hand of a transmitter component, designed in form of a ring, on whose circumferential surface is provided a coding 51. Same consists of three tracks in circumferential direction, in which are respectively arranged 3 markings 53 extending in axial direction. The respective markings in one line represent digital words $W_i$, with 3 bits each. Any respective sequential words Wi are preferably provided in circumferential direction directly adjacent to each other.

The ring 49 is pushed onto bushing 33 and held torsion-proof on same. With a turn of the steering wheel 1, the ring 49 is thus also turned together with the bushing 33.

As is apparent from FIG. 2, the markings 53 of each track provided on the circumferential surface of ring 49 are respectively registered by a detector 55. The three detectors may for example be designed as Hall-sensors which register, accordingly, magnetically designed markings 53 of coding 51. The signal of detectors 55 is likewise conducted to the evaluation unit 11.

Instead of the three detectors 55, it is, of course, possible to also employ one single detector, which facilitates separate registration of markings 53 of the three tracks with sufficient speed. Marking 53 and detectors 55 can also be realized in any other manner, for example as optical markings and optical detectors. By appropriate signal evaluation, it is, of course, self-understood, that also only one single sensor may be provided, which scans the markings 51 of all tracks.

In order to obtain, for example, a resolution of 1.5°, 240 digital words $W_i$ are required.

With conventional digital absolute value transmitters, a coding is generally employed, which, by scanning each word, i.e. the bits in one line, facilitates the determination of a value assigned to said word. With the forenamed required resolution of 1.5°, thus 8 bits would be needed in order to instantly be able to determine via one single scanning of a word $W_i$ the angle of rotation. This, however, would be connected with disproportionately high expenditure, both in preparing the coding as well as in manufacturing the ring 49 and also in the realization of the detectors 55.

According to the invention, it is therefore proposed, to ascertain the absolute position of the transmitter component or the absolute rotation angle by evaluation of a predetermined number of p sequentially detected digital words $W_i$, i.e. by the evaluation of one each p-measure ($W_i$, $W_{i+1}, \ldots, W_{i+p-1}$).

The in represented specific embodiment, the width of the words $W_i$ is equal to three bits.

In actual practice it has been demonstrated that in this case by the evaluation of each three sequential digital words $W_i$—which may then take on the values from 0 to 7 - - - ($2^3-1=7$) a resolution of 1.5° is readily realizable, whereby the maximally overtravelled angle area amounts to 4.5° for determination of the absolute angle (depending upon the design of the detectors and the markings on the transmitter component).

This ensures, even with a first-time start-up of the absolute value transmitter 5, that following overtravel of an angle area (in the same direction) of 4.5°, the absolute angle of the steering shaft is determinable with a resolution and an accuracy of better than 1.5°.

According to the invention, coding is selected in such manner that the already mentioned conditions are complied with, whereby p=3 is to be used here:

a) each two adjacent words, $W_i$ $W_{i+1}$ have different values, in other words $W_i$ does not equal $W_{i+1}$ (step recognition);

b) the words $W_{i-1}$ and $W_{i+1}$ adjacent respectively to a word $W_i$, have different values, in other words, $W_{i-1}$ and $W_{i+1}$ are not equal (recognition of change in the direction of rotation);

c) each sequence ($W_i$, $W_{i+1}$, $W_{1+2}$) of respectively 3 sequential words of the coding is, at least within a predetermined area of the coding, uniquely defined, in other words, the following applies: ($W_i$, $W_{i+1}$, ..., $W_{i+2}$) is not equal to ($W_k$, $W_{k+1}$, $W_{k+2}$) with respect to i not equal to k (uniquely defined coding within one area of coding);

d) no sequence ($W_i$, $W_{i+1}$, $W_{i+2}$) may exist, in at least one uniquely defined area of the coding as mirror-image sequence ($W_{i+2}$, $W_{i+1}$, $W_i$)—in other words, the following applies: ($W_i$, $W_{i+1}$, $W_{i+2}$) is not equal ($W_{i+2-k}$, $W_{i+1-k}$, $W_{i-k}$) (recognition of the absolute rotation direction).

Taking into account all of these conditions, the result, however, is that with the employed word width of 3 bits, the number of possible words is insufficient, so that the entire coding at the circumference of ring 49 must be divided into two areas I, II (FIG. 3) which each cover an angle of 180°.

In each of the two areas I, II the same coding is used, whereby in both coding areas the same coding direction exists. At the two interfaces 60, 62, the aforementioned conditions are likewise complied with.

Figure 3:
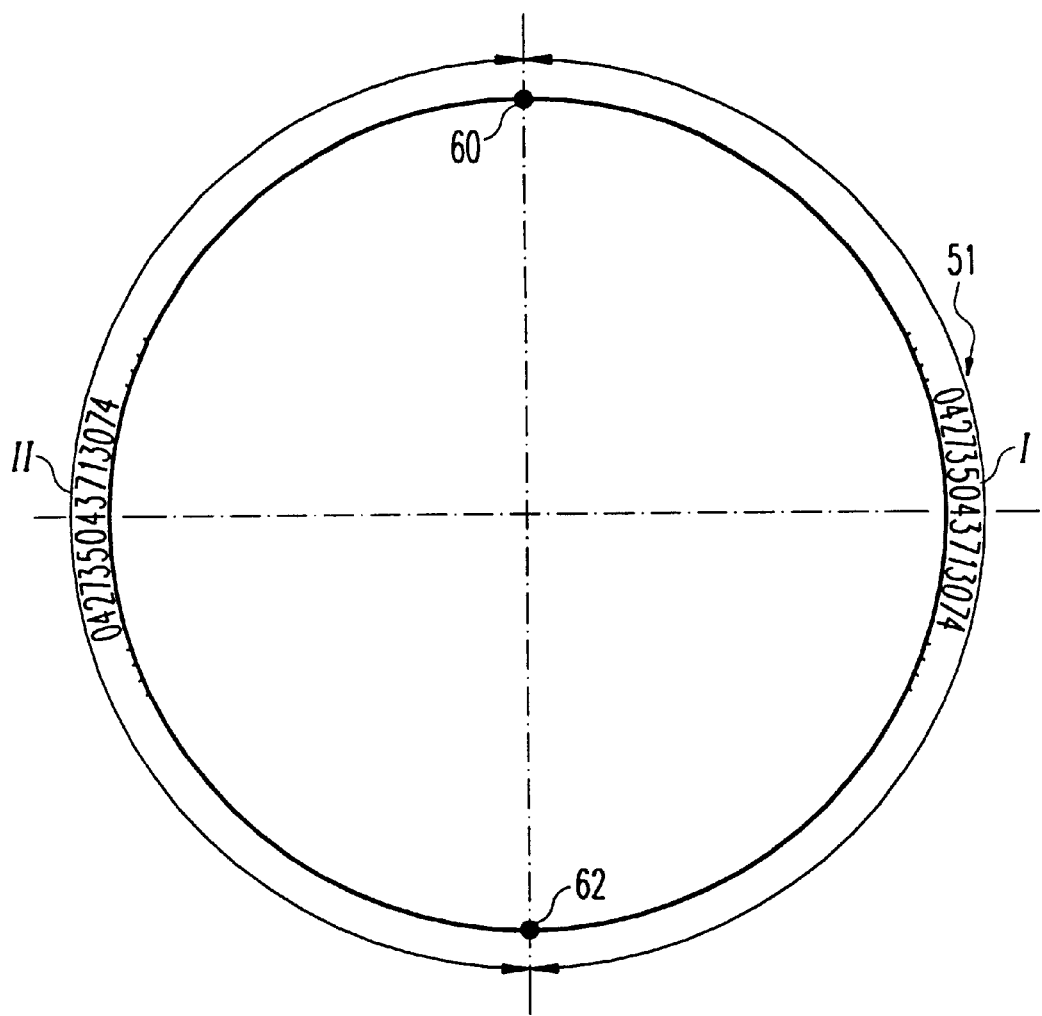
FIG. 3 shows a schematic representation of a permissible encoding according to a preferred specific embodiment of the invention.

With respect to the example for coding of ring 49, depicted schematically in FIG. 3 there thus result 120 digital words $W_i$ per area, which corresponds to the required resolution of 1.5°.

Since the plunger coil unit 39 and the ring 49 are coupled mechanically with the steering shaft 31, there is a fixed relationship between the signal of the plunger coil unit serving as approximate registration device and the signals of the detectors 55. The equivocation of the signals of the detectors, which respectively generate 3-bit words can be eliminated in the following manner by additional evaluation of the signal of the plunger coil unit.

As starting point, a situation is selected in which the absolute value transmitter 5 is connected, for the first time, to the energy source and, consequently, not one single digital word $W_i$ of coding 51 has been registered by scanning of marking 53 via detectors 55.

Nevertheless, in said starting situation, the signal $S_T$ of the plunger coil unit 39 is passed to the evaluation unit 11, and can be evaluated by the evaluation unit. To that end, for example, the evaluation unit 11 compares, for example, the momentary value of the signal $S_T$ of the plunger coil unit 39 with a prior known characteristic curve $\alpha_a(S_T)$ which may be stored, for example as functional dependence or in form of digitalized values in the evaluation unit 11, and establishes in this fashion an approximate value for the angle of rotation.

If the angle of rotation $\alpha$ is required by other components of the motor vehicle, for example by the steering unit of a dynamic moving gear, then said approximate value ($\alpha_a(S_T)$) may initially be emitted by the absolute value transmitter to said steering unit.

If then at any random point in time, the steering column is rotated and if during the rotation an angle surface of at least 4.5° in the same direction is overswept, then the evaluation unit can already determine from the three first registered digital words $W_i$, i.e. the first 3 digit measurement, the absolute rotation angle with the accuracy specified by the coding.

In order to eliminate the equivocation of the 3-digit measurement—initially, starting from a straight-on position, it is not known in what position the steering column is located—the evaluation unit first determines an admissible tolerance range for the approximate angle $\alpha_a$ ascertained from the signal $S_T$ of the plunger coil unit.

For that purpose, a value for an error barrier $\alpha$ is, for example, stored in the plunger coil unit. With it, the evaluation unit 11 determines the tolerance range for $\alpha_a-\delta<\alpha_a+\delta$, whereby the width 2d of the tolerance range is smaller than each of the two uniquely defined areas of the coding of the transmitter component, i.e. smaller than 180°.

Furthermore, the evaluation unit 11 determines by evaluating the first 3-digit measure of the first (multi-valued, but accurate) rotation angle $\alpha_r$, which lies in the area [0; 180].

Finally, the evaluation unit 11 ascertains whether the value $\alpha_r$ is smaller than, identical to or larger than half the mail possible value for the rotation angle $\alpha_r$. Depending upon this check, the evaluation unit 11 can determine the corrected value $\alpha_{r.corr}$ by evaluating the following specifications:

$$\alpha_{r.corr}=INT[(\alpha_a+\delta)/\alpha_{r.max}]\times\alpha_{r.max}+\alpha_r$$

for $\alpha_{r.max}</2$ $$\alpha_{r.corr}=INT[(\alpha_a-\delta)/\alpha_{r.max}]\times\alpha_{r.max}+\alpha_r$$

for $\alpha_{r.max}>/2$

INT designates the integral-division.

For example, evaluation of the signal $S_T$ of the plunger coil unit produces a value of $\alpha=535°$ and evaluation of coding produces a value of $\alpha_r=3°$, consequently, the condition $\alpha_r=3<90°$ is satisfied. This in regard to the first of the aforementioned conditions and thereby to $\alpha_{r.corr}=INT[555°/180°]\times180°+3=543°$, whereby the error barrier of the approximate registration for the absolute angle was selected at $\delta=20°$ by means of the plunger coil unit.

Following said initial registration of the exact steering angle, in the future the absolute value can be determined by detection of individual steps and changes in the direction of rotation via simple incrementation or decrementation. Needless to say, of course, it is also possible to utilize with each step or at pre-determined intervals or for certain reasons the above described process with additional utilization of the plunger coil unit signal.

Explanation of a simple process for the determination of a permissible coding is given below, taking into account all requirements mentioned in claim 2:

In a first step all possible sequences of p-sequential words are ascertained and arranged in a table.

In the second step all inadmissible sequences are eliminated according to the conditions for step recognition and recognition of changes in the movement direction.

In a third step a random sequence is selected as starting value.

In a fourth step, this sequence is stricken from the prepared table. The mirror-image sequence is likewise stricken.

In a fifth step, the p−1 last words $W_{i+1}, W_{i+p-2}, W_{i+p-1}$, of the last selected sequence are selected as the p−1 first words $W_i, W_{i+1}, \ldots, W_{i+p-2}$ of the succeeding sequence of coding and a sequence is selected from the remaining possibilities in the prepared table, which has the same p−1 first words. The selected sequence is again stricken, the same as the mirror-image sequence.

Said fifth step is repeated until an adequate coding length has been reached or until all available sequences have been used. Where appropriate, the starting value or the selection criterion, which is selected from among several possible p-measures, may be altered in case the process should break off prematurely.

In case of cascading of several coding areas, adherence to conditions at the interfaces can be checked or secured "by hand".

The following contains an explanation of another, not represented, specific embodiment for a digital absolute value transmitter. In this specific embodiment, in order to avoid problems with respect to step recognition by undefined transition conditions at the boundaries of adjacent words, a track of coding may be designed in such manner that in said track is formed an alternating sequence of values logical "zero" and logical "one". Based on that information, step recognition can then take place by means of scanning said track by two, in scanning direction staggered detectors (preferably by half a step) via appropriate evaluation of sensor signals in the evaluation unit. The evaluation unit can then, at a "safe point in time", trigger a scanning of the respective digital word. In addition, the evaluation unit is able to establish from the phase displacement of the signals (using the knowledge of the arrangement of the detectors) recognition of of direction of rotation and also recognition of a change in the direction of rotation.

As a result of the requirement of an alternating sequence of "zero" and "one" in one of the tracks of the coding, however, the available sequences of p-digital words, which are clearly defined within one region, are clearly lower than with the previously represented variation. This applies at least in the event that one wanted to observe all the aforementioned requirements with respect to the coding.

In the event, however, that recognition of the direction of rotation or recognition of a change in the direction of rotation takes place by evaluation of signals of the detectors then, within one uniquely defined region of the coding, there may also exist for one, several or all (nested) sequences of p-digital words the respective mirror-image sequence. As a result of the known rotational direction, the evaluation unit knows, even with utilization of a FiFo-register (and therewith related identical detected p-measures, during overtravel of a certain sequence from the one direction and during overtravel of the mirror-image from the other direction) which sequence is involved within the uniquely defined area.

In order to have the greatest possible coding length within one uniquely defined area, one naturally will use also for all or almost all sequences the respective mirror-image sequence.

In another specific embodiment one can, of course, also use in addition to the m track of the digital words another track with alternating sequences of "zero" and "one", which is scanned with two additional detectors. The step recognition or the recognition of the rotational direction or of a change in rotation direction is thereby de-coupled from the coding.

What is claimed is:

1. An absolute value transmitter, comprising:
   a transmitter component including a coding having a predetermined number n of locally sequential digital words ($W_i$), each having a width of m individual bits ($b_1, b_2, \ldots b_m$) in adjacent tracks;
   at least one detector simultaneously registering the individual bits ($b_1, b_2, \ldots b_m$) defining one of the digital words ($W_i$), the transmitter component being movable with respect to the at least one detector; and
   an evaluation unit for receiving respective signals from the at least one detector and determining an absolute position of the transmitter component relative to at least the one detector, at least for a first time, by evaluating a predetermined number p of the sequentially detected digital words ($W_i$), the evaluation unit assigning to a detected p-tuple ($W_i, W_{i+1}, W_{i+p-1}$), including a predetermined number p of the sequentially detected digital words ($W_i$), a defined position value of the transmitter component relative to the at least one detector, all of the sequences ($W_i, W_{i+1}, W_{i+p-1}$) from the predetermined number p including the sequential words ($W_i$) being uniquely defined within at least one predetermined uniquely defined area (I, II) of the coding, and the digital words ($W_i$) not being uniquely defined within each of the at least one uniquely defined areas (I, II).

2. The absolute value transmitter as set forth in claim 1, wherein the coding satisfies at least one of a group of conditions including:
   a) two of the respective adjacent words ($W_i, W_{i+1}$) having different values;
   b) each of the words ($W_{i-1}$) and ($W_{i+1}$), respectively adjacent to the word ($W_i$), having different values; and
   c) no sequence ($W_i, W_{i+1}, \ldots, W_{i+p-1}$) existing as a mirror-image sequence ($W_{i+p-1}, \ldots, W_{i+1}, W_i$), within at least the one uniquely defined area (I, II) of the coding.

3. The absolute value transmitter as set forth in claim 2, wherein the evaluation unit ascertains a direction of an absolute movement by comparing one of the detected p-tuples with a stored image of the coding for complying with the condition c).

4. The absolute value transmitter as set forth in claim 2, wherein the coding on the transmitter component includes the at least two connected areas (I, II), each of the at least two connected areas (I, II) having the predetermined number n of the digital words ($W_i$).

5. The absolute value transmitter as set forth in claim 4, wherein the group of conditions are satisfied, at least at one of two interfaces of the two areas (I, II).

6. The absolute value transmitter as set forth in claim 1, wherein the evaluation unit determines the absolute position of the transmitter component relative to at least the one detector by respectively assigning the corresponding position value to the detected p-tuple ($W_i, W_{i+1}, \ldots, W_{i+p-1}$).

7. The absolute value transmitter as set forth in claim 6, wherein the evaluation unit determines, after a one-time determination of the absolute position, a future absolute position of the transmitter component relative to at least the one detector via at least one of incrementing and decrementing the one-time determined position value.

8. The absolute value transmitter as set forth in claim 1, wherein the evaluation unit ascertains a change in a rotational direction by comparing the digital words $W_{p-3}$ and $W_{p-1}$ of the detected p-tuple and detects, if $W_{p-3}$ and $W_{p-1}$ are equal, a change in the rotational direction following an over-travel of the digital word $W_{p-2}$.

9. The absolute value transmitter as set forth in claim 1, wherein the evaluation unit determines the absolute position by:
  1) generating a first output via incrementing/decrementing a prior value; and
  2) generating a second output via evaluating an appropriate detected p-tuple, the evaluation unit generating an error signal if the first and second outputs are not equal.

10. The absolute value transmitter as set forth in claim 1, wherein:
  the width m of the digital words ($W_i$) equals three; and
  the predetermined number p of the sequential words for the position determination equals three.

11. The absolute value transmitter as set forth in claim 1, wherein for recognizing at least one of a rotational direction, a change in the rotational direction, and a step, one of a) a supplemental track is provided, in addition to the adjacent tracks for the digital words ($W_i$), having a sequential series of values including logical "zeros" and logical "ones", and b) one of the adjacent tracks includes the sequential series of values including the logical "zeros" and the logical "ones".

12. The absolute value transmitter as set forth in claim 11, wherein:
  two detectors, staggered by a half step, are provided for scanning the track including the alternating sequences of the logical "zeros" and the logical "ones"; and
  the evaluation unit determines at least one of the rotational direction and the change in the rotational direction from a phase displacement of respective ones of the signals.

13. The absolute value transmitter as set forth in claim 12, wherein:
  within the at least one uniquely defined area (I, II), a respective mirror-image sequence ($W_{i+p-1}, \ldots, W_{i+1}, W_i$) exists for at least one of the sequences ($W_i, W_{i+1}, \ldots, W_{i+p-1}$) of coding; and
  the evaluation unit determines the absolute value from the rotational direction and the detected p-tuple.

14. The absolute value transmitter as set forth in claim 1, wherein:
  a registration device determines an approximate registration of the absolute position, the approximate registration being more accurate than a difference of values corresponding to two limits for each of at least the two areas (I, II); and
  the evaluation unit, for determining the absolute position within the entire coding, determining an approximate absolute position value via the registration device and determining the absolute position value as a function of the respective signals provided by the at least one detector, the absolute position value being multi-valued.

15. The absolute value transmitter as set forth in claim 14, wherein the evaluation unit:
  determines an actual signal ($S_T$) of the registration device indicating an approximate registration of a corresponding position value ($\alpha_a$);
  determines a lower barrier ($\alpha_a - \delta$) and an upper barrier ($\alpha_a + \delta$) of a permissible tolerance range for the corresponding position value ($\alpha_a$), a width ($2\delta$) of the tolerance area being smaller than each of the uniquely defined areas (I, II) of the coding of the transmitter component;
  determines a multi-valued position value ($\alpha_r$) by evaluating the respective signals of the at least one detector registering the coding; and
  determines a corrected absolute value ($\alpha_{r,corr}$) according to:

$$\alpha_{(r,corr)} = \left(INT\frac{[\alpha_a + \delta]}{\alpha_{r,max}} \times \alpha_{r,max}\right) + \alpha_r \text{ for } \alpha_r < \frac{\alpha_{r,max}}{2},$$

$$\text{and } \alpha_{(r,corr)} = \left(INT\frac{[\alpha_a - \delta]}{\alpha_{r,max}} \times \alpha_{r,max}\right) + \alpha_r \text{ for } \alpha_r < \frac{\alpha_{r,max}}{2}.$$

16. The absolute value transmitter as set forth in claim 15, wherein:
  the evaluation unit determines if the corrected absolute value ($\alpha_{r,corr}$) is within the permissible tolerance range; and
  if an error occurs, the evaluation unit generates an error signal and compensates the registration device for the approximate registration of the absolute position.

17. The absolute value transmitter as set forth in claim 16, wherein:
  the evaluation unit determines a difference between the determined absolute value ($\alpha_{a,corr}$) and the corresponding position value ($\alpha_a$); and
  the evaluation unit writes the corresponding position value ($\alpha_a$) in a non-volatile memory, the corresponding position value ($\alpha_a$) being read from the non-volatile memory as a corrective value for subsequent determinations of the corresponding position value ($\alpha_a$).

18. The absolute value transmitter as set forth in claim 1, wherein the transmitter component is formed as a ring.

19. The absolute value transmitter as set forth in claim 18, wherein:
  the transmitter component is rotatably joined with a component, having an angle of rotation to be registered;
  the coding arranged on the transmitter component is endless on an outer circumference of the transmitter component; and
  each interface satisfies the group of conditions.

20. A rotation transmitter for registering a steering angle of a motor vehicle, comprising:
  a rotatable transmitter mechanically connected to a steering wheel;
  a coding, included on the transmitter, having a predetermined number n of locally sequential digital words ($W_i$), each having a width of m individual bits ($b_1, b_2, \ldots b_m$), in adjacent tracks;
  at least one detector simultaneously registering the individual bits ($b_1, b_2, \ldots b_m$) defining one of the digital words ($W_i$), the transmitter being movable with respect to the at least one detector;
  a plunger device, mechanically connected to the steering wheel, a rotational movement of the steering wheel causing a corresponding translational movement of the plunger device, for indicating an approximate registration of the absolute steering angle; and an evaluation unit for receiving a signal from the plunger device and respective signals from the at least one detector for determining an absolute position of the transmitter relative to the at least one detector, at least for a first time, by evaluating a the approximate registration of the absolute steering angle anti the predetermined number p of the sequentially detected digital words ($W_i$), the evaluation unit assigning to a detected p-tuple ($W_i$, $W_{i+1}$, $W_{i+p-1}$), including a predetermined number p of the sequentially detected digital words ($W_i$), a defined position value of the transmitter relative to the at least one detector, all of the sequences ($W_i$, $W_{i+1}$, $W_{i+p-1}$) from the predetermined number p including the sequential words ($W_i$) being uniquely defined within at least one predetermined uniquely defined area (I, II) of the coding, and the digital words ($W_i$) not being uniquely defined within each of the at least one uniquely defined areas (I, II).

21. A method for registering a steering angle of a motor vehicle, comprising:

determining a coding on a transmitter component using at least one detector for simultaneously registering individual bits ($b_1$, $b_2$, ... $b_m$) defining respective digital words ($W_i$), the transmitter component being movable with respect to the at least one detector, the coding including a predetermined number n of locally sequential digital words ($W_i$), each having a width of the m individual bits ($b_1$, $b_2$, ... $b_m$), in adjacent tracks;

receiving respective signals from the at least one detector into an evaluation unit; and determining an absolute position of the transmitter component relative to at least the one detector, at least for a first time, by evaluating a predetermined number p of the sequentially detected digital words ($W_i$), the evaluation unit assigning to a detected p-tuple ($W_1$, $W_{i+1}$, $W_{i+p-1}$), including a predetermined number p of the sequentially detected digital words ($W_i$), a defined position value of the transmitter component relative to the at least one detector, all of the sequences ($W_i$, $W_{i+1}$, $W_{i+p-1}$) from the predetermined number p including the sequential words ($W_i$) being uniquely defined within at least one predetermined uniquely defined area (I, II) of the coding, and the digital words ($W_i$) not being uniquely defined within each of the at least one uniquely defined areas (I, II).

* * * * *